M. P. CALKINS.
BEAN AND PEANUT HARVESTER AND PICKER.
APPLICATION FILED MAY 4, 1908.
944,945.
Patented Dec. 28, 1909.
3 SHEETS—SHEET 1.
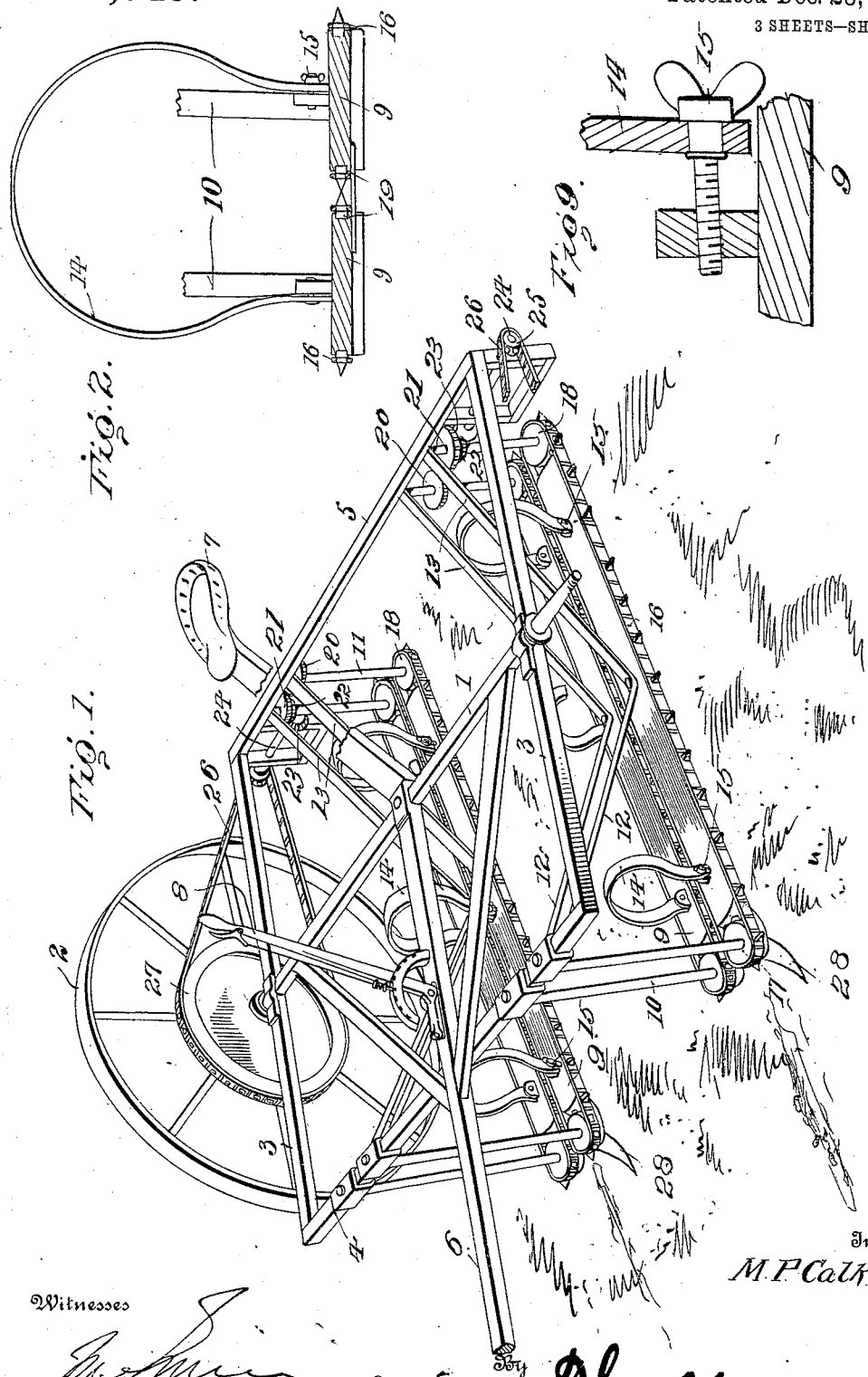
Witnesses
Inventor
M. P. Calkins
By
R. H. A. Lacey, Attorneys M. P. CALKINS.
BEAN AND PEANUT HARVESTER AND PICKER.
APPLICATION FILED MAY 4, 1908.
944,945.
Patented Dec. 28, 1909.
3 SHEETS—SHEET 2.
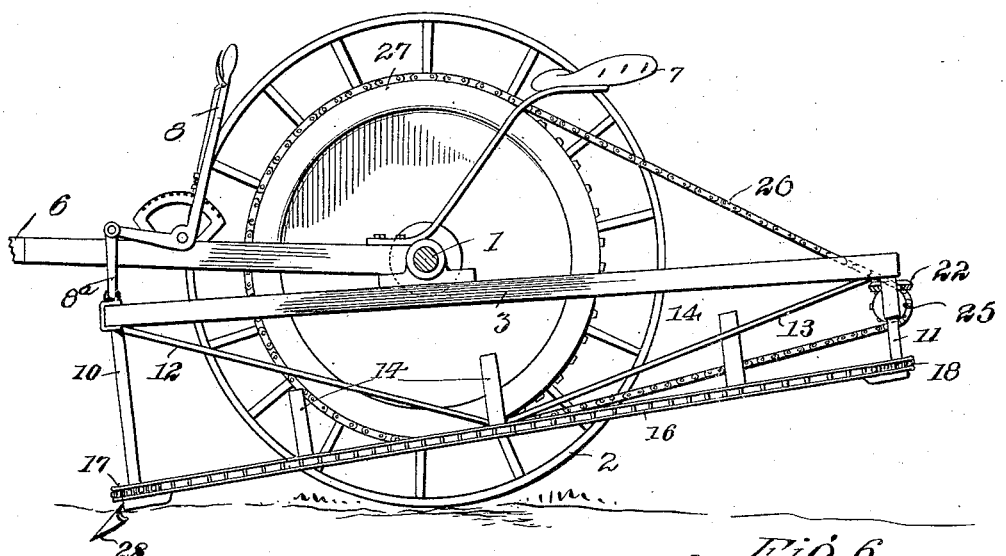
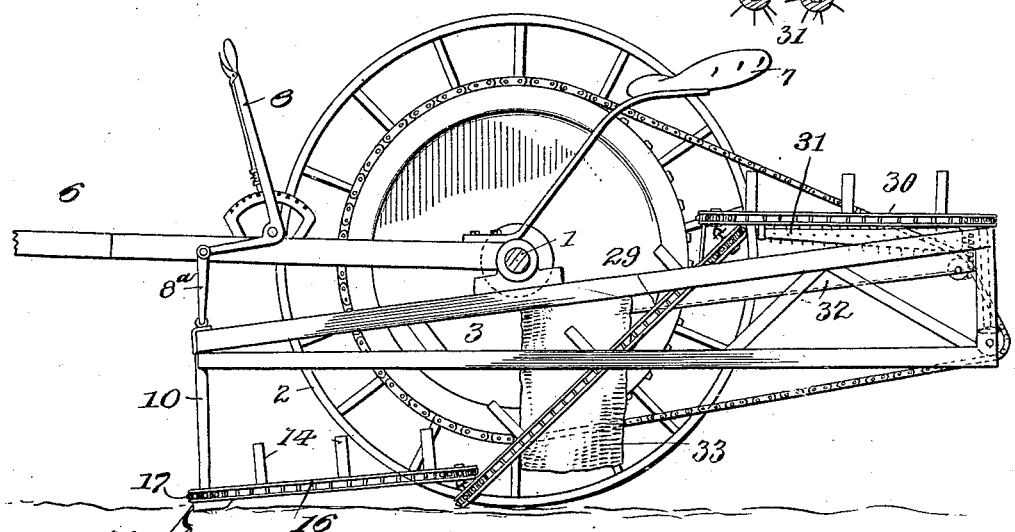
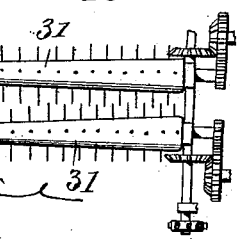
Witnesses
Inventor
M. P. Calkins
By Lacey, Attorneys

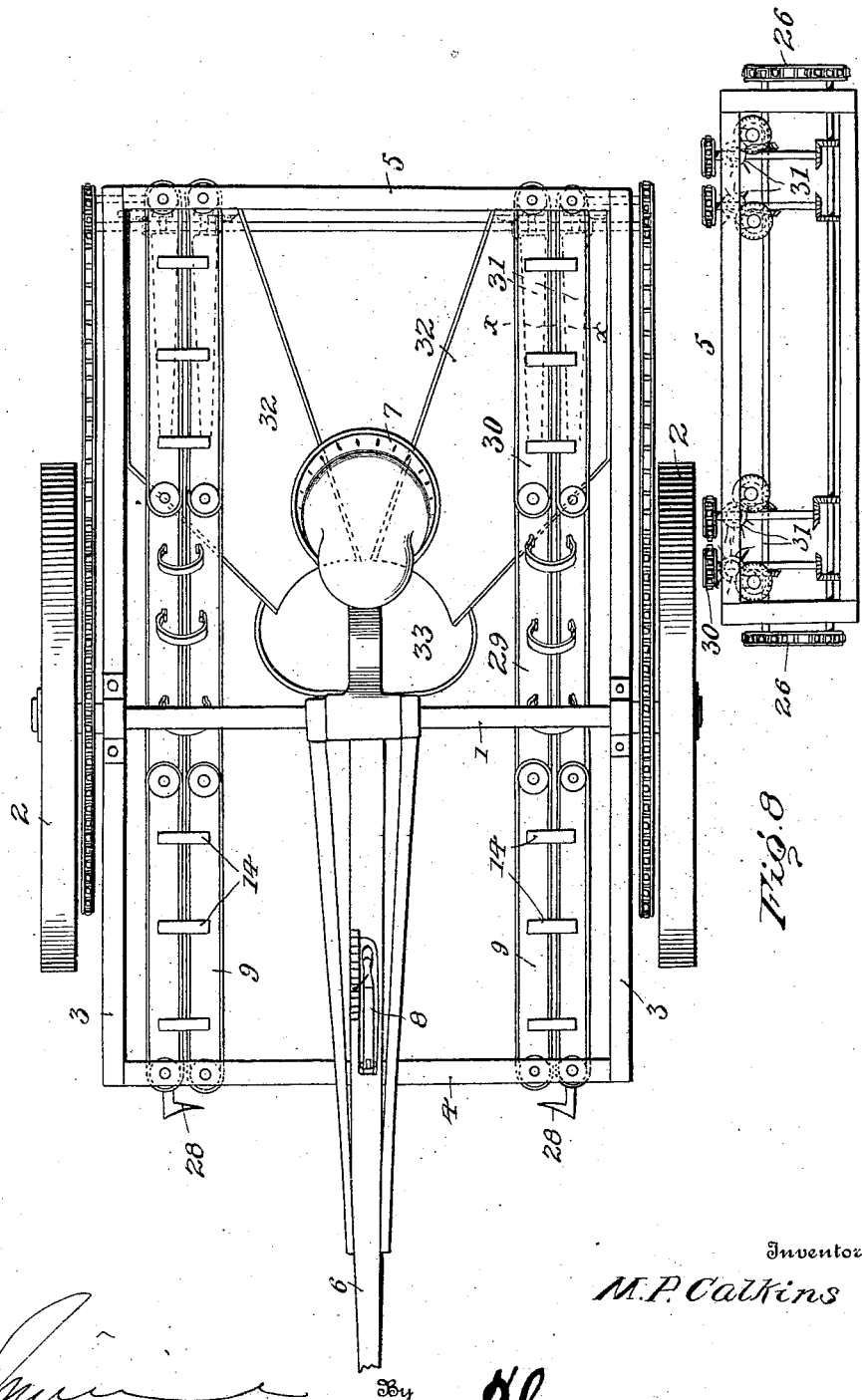

UNITED STATES PATENT OFFICE.

MIEL P. CALKINS, OF VARYSBURG, NEW YORK.

BEAN AND PEANUT HARVESTER AND PICKER.

944,945.

Specification of Letters Patent.   Patented Dec. 28, 1909.

Application filed May 4, 1908. Serial No. 430,786.

*To all whom it may concern:*

Be it known that I, MIEL P. CALKINS, citizen of the United States, residing at Varysburg, in the county of Wyoming and State of New York, have invented certain new and useful Improvements in Bean and Peanut Harvesters and Pickers, of which the following is a specification.

The present invention provides a machine designed more especially for harvesting beans, peas and the like, and for picking the same from the vines.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a machine embodying the invention as it appears when adapted for harvesting or pulling beans or peanuts, one of the ground wheels being omitted in order to clearly illustrate the invention. Fig. 2 is a transverse section of a pair of bars supporting the puller chains and showing a connecting spring. Fig. 3 is a side view of the machine. Fig. 4 is a side view of a machine adapted for both harvesting and picking peanuts, showing the picking mechanism in position. Fig. 5 is a top plan view of the picking mechanism. Fig. 6 is a transverse section on the line $x$—$x$ of Fig. 7, of a pair of picker rolls and the bars and chains coöperating therewith. Fig. 7 is a top plan view of the machine illustrated in Fig. 4. Fig. 8 is a rear view of the framework of the machine, bringing out more clearly the relation of the picker mechanism and the operating means therefor. Fig. 9 is a detailed sectional view showing the manner of adjusting the tension of the connecting springs.

Corresponding and like parts are referred to in the following description and indicated in all the views of the drawings by the same reference characters.

The machine embodies a suitable framework which is mounted upon an axle 1, the latter being provided with ground wheels 2 which also constitute drivers for operating the pulling and picking mechanisms when the machine is in operation. The framework embodies longitudinal bars 3, a front bar 4 and a rear bar 5. The longitudinal bars 3 are mounted intermediate of their ends upon the axle 1 so as to turn thereon and admit of the shovels and pulling mechanism being adjusted vertically. The pole or tongue 6 is connected at its rear end to the axle 1 and supports the seat 7. A lever 8 pivoted upon the rear portion of the pole or tongue 6 is connected by link 8ª with the front bar 4 of the framework and is provided with a latch to coöperate with a notched bar so as to hold the frame in the required adjusted position.

A harvesting or puller mechanism is provided at each side of the machine to enable the same to operate upon two rows at one time. Inasmuch as each puller mechanism is the duplicate of the other, a detailed description of one only will be given. A pair of bars 9 are arranged in parallel relation and incline upwardly and rearwardly and have connection with the framework to admit of a limited lateral movement. Front standards 10 and rear standards 11 support the said bars which are also held in place by braces 12 and 13, the former inclining rearwardly and downwardly from the front bar 4, and the latter inclining forwardly and downwardly from the rear bar 5. Springs 14 connect the bars 9 and admit of their yielding laterally according to the size of the vines passing therebetween. Adjusting screws 15 coöperate with the springs 14 to admit of their tension being effectively regulated, as best shown in Fig. 9 of the drawings. Puller chains 16 are fitted to each bar 9 and encircle the same. Sprocket wheels 17 are loose upon the standards 10, whereas the sprocket wheels 18 are fast to the standards 11 so as to turn therewith, said standards 11 also constituting shafts. The puller chains 16 are driven so that their opposing portions travel rearward at about the same rate of speed as the machine advances, hence the vines when gripped between coöperating puller chains are held fast and are lifted as the inner portions of said puller chains travel rearward by reason of the upward and rearward inclination of said puller chains. The tension of the springs 14 is such as to cause the puller chains to firmly grip the vines and uproot the same. The bars 9 serve to reinforce and support the puller chains and in order to reduce the friction between said puller chains and the bars 9 to the smallest amount possible, said bars are provided along their inner edges with rollers 19.

For operating the puller chains 16, the standards or shafts 11 are provided near their upper ends with gear wheels 20 and 21 which intermesh. The gear wheel 21 is provided with a bevel gear 22 which is in mesh with a bevel gear 23 fast to a transverse shaft 24, the latter being provided at its outer end with a sprocket wheel 25. A sprocket chain 26 connects the sprocket wheel 25 with a sprocket wheel 27 fast to or forming a part of the ground wheel 2.

A shovel 28 is fitted to the lower end of one of the standards 10 and is adapted to loosen the vines and to cut the tap root, thereby enabling the puller chains to easily uproot the vines. The standards 10 may be adjusted laterally and any means may be provided for adjustably connecting them to the bar 4.

In the construction shown in Fig. 4, the machine is modified so as to embody a picking mechanism for stripping the peanuts from the vines. In addition to the pulling mechanism 16, which is substantially the same as that shown and described in connection with Figs. 1, 2 and 3, elevator sections 29 and 30 are provided, each being substantially the same in construction as the pulling mechanism 16. The chains of the several sections 16, 29 and 30 are adapted to be operated by any suitable mechanism. Beneath the upper rear section 30 is located the picker mechanism, the same consisting of tapered rolls 31 studded with teeth and adapted to be rotated so that their inner portions travel toward each other and downwardly, thereby drawing the peanuts from the vines and discharging the same into a pan 32 from which they are discharged into a sack 33 or other receptacle. Suitable mechanism is provided for rotating the picker rolls 31, said mechanism deriving power from the ground wheels 2 in the manner substantially as indicated.

Having thus described the invention, what is claimed as new is:

1. In a machine of the character specified, a wheeled truck including a pivoted supporting frame, coöperating companion elements depending from the frame and having an upward and rearward inclination, substantially U-shaped springs connecting said elements for normally and yieldably supporting the same in spaced parallel relation to each other, and adjusting screws connecting said springs with one of the elements to vary their effective tension.

2. In a machine of the character specified, the combination of upwardly and rearwardly inclined companion elements, endless chains fitted to said elements, anti-friction rollers journaled on the elements and adapted to bear against the adjacent chains, means for imparting motion to said endless chains, and substantially U-shaped springs connecting the companion elements for normally and yieldably supporting the same in spaced parallel relation to each other.

3. In a machine of the character specified, a wheeled truck, a supporting frame having its intermediate portion pivotally mounted on the axle of the truck, companion bars depending from the supporting frame and inclined upwardly and rearwardly, front and rear standards connecting the opposite ends of the bars with the framework, the front standards being fixed and the rear standards mounted for rotation, sprocket wheels loose upon the front standards, other sprocket wheels fast to the rear standards, sprocket chains supported upon said sprocket wheels and encircling the bars, and anti-friction rollers journaled on the opposite longitudinal edges of said bars for engagement with the adjacent sprocket chains.

4. In a machine of the character specified, a wheeled truck, a supporting frame pivotally mounted on said truck, companion bars depending from the supporting frame and inclined upwardly and rearwardly beneath the latter, inclined braces forming a connection between the intermediate portions of the bars and the opposite ends of the supporting frame, endless chains encircling the bars and mounted for rotation thereon, substantially U-shaped springs forming a yieldable connection between said bars, and means operatively connected with the wheels of the truck for rotating the sprocket chain.

5. In a machine of the character described, the combination of upwardly and rearwardly inclined companion bars having their upper faces provided with vertically disposed lugs, endless chains encircling the bars and mounted for rotation thereon, substantially U-shaped springs connecting the bars for normally and yieldably maintaining said bars in spaced parallel relation, one end of each spring being rigidly secured to one of the lugs on the bar and the opposite end thereof adjustably connected with the adjacent lug on the other companion bar.

In testimony whereof I affix my signature in presence of two witnesses.

MIEL P. CALKINS. [L. S.]

Witnesses:
FRANK A. GODFREY,
WALTER L. SPINK.